United States Patent
Balgobin et al.

(10) Patent No.: US 12,209,479 B1
(45) Date of Patent: Jan. 28, 2025

(54) CONTROLLED DEPLOYMENT OF SHAPE-MEMORY ARTICLES

(71) Applicant: Baker Hughes Oilfield Operations LLC, Houston, TX (US)

(72) Inventors: Amrit Balgobin, Houston, TX (US); Jason Harper, Cypress, TX (US)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 0 days.

(21) Appl. No.: 18/350,299

(22) Filed: Jul. 11, 2023

(51) Int. Cl.
*E21B 33/12* (2006.01)
*E21B 43/10* (2006.01)
*F03G 7/06* (2006.01)

(52) U.S. Cl.
CPC .......... *E21B 33/1208* (2013.01); *E21B 43/10* (2013.01); *F03G 7/0614* (2021.08); *E21B 2200/08* (2020.05)

(58) Field of Classification Search
CPC .. E21B 33/1208; E21B 43/10; E21B 2200/08; F03G 7/0614
See application file for complete search history.

(56) References Cited

U.S. PATENT DOCUMENTS

| | | | | |
|---|---|---|---|---|
| 8,684,075 | B2 * | 4/2014 | Guest | B21F 45/008 166/207 |
| 2008/0296023 | A1 * | 12/2008 | Willauer | C08K 3/08 977/735 |
| 2011/0232901 | A1 * | 9/2011 | Carrejo | E21B 43/108 166/227 |
| 2013/0081815 | A1 * | 4/2013 | Mazyar | E21B 36/008 166/302 |
| 2013/0292117 | A1 * | 11/2013 | Robisson | E21B 43/103 166/227 |

* cited by examiner

*Primary Examiner* — Brad Harcourt
(74) *Attorney, Agent, or Firm* — CANTOR COLBURN LLP

(57) ABSTRACT

A downhole assembly includes: a shape-memory article; and a deployment control element adjacent the shape-memory article, the deployment control element having a body and a seal element that forms an enclosure together with the body, the deployment control element further including an activation fluid disposed in the enclosure, wherein the body, the seal element, or both of the deployment control element is degradable in the presence of the activation fluid.

17 Claims, 3 Drawing Sheets

CONTROLLED DEPLOYMENT OF SHAPE-MEMORY ARTICLES

BACKGROUND

Shape-memory polymers (SMPs) are polymers that regain their original shape when heated above their glass transition temperature (Tg). Articles are formed from shape-memory polymers by first heating above the glass transition temperature and shaping the polymer, then subsequently fixing the shape by cooling to below the glass transition temperature. During deployment, the shaped articles are heated above the glass transition temperature or slightly below the glass transition temperature to allow recovery of the first molded shape. In addition to temperature change, the shape-memory effect can also be triggered by an electric or magnetic field, light, contact with a particular fluid or a change in pH.

Shape-memory polymers are useful as materials of construction of elements for a variety of downhole applications, particularly those that require the sealing off of a portion of a borehole or constricting the spacing around an element, whether coaxial with the borehole or otherwise. Shape-memory polymers can also be used in sand control applications.

However, to deploy shape-memory articles downhole, dedicated pumping operations are often required, which can be time consuming and complex for certain applications. Accordingly, alternative effective methods to deploy shape-memory articles are continuously sought.

SUMMARY

A downhole assembly includes: a shape-memory article; and a deployment control element adjacent the shape-memory article, the deployment control element having a body and a seal element that forms an enclosure together with the body, the deployment control element further including an activation fluid disposed in the enclosure, wherein the body, the seal element, or both of the deployment control element is degradable in the presence of the activation fluid.

A method includes: introducing into a wellbore or a pipe a downhole assembly including a shape-memory article in a compacted shape, and a deployment control element adjacent the shape-memory article, the deployment control element having a body and a seal element that forms an enclosure together with the body, the deployment control element further having an activation fluid disposed in the enclosure, wherein the body, the seal element, or both is degradable in the presence of the activation fluid; degrading the body, the seal member, or both of the deployment control element with the activation fluid; releasing the activation fluid from the deployment control element; and contacting the shape-memory article in the compacted shape with the released activation fluid to cause the shape-memory article to expand, and conform to a surface of the wellbore or the pipe.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Downhole assemblies and methods for deploying and using these assemblies (e.g., filtering sand and other undesirable material from fluid in a downhole environment) are described herein.

The downhole assemblies include one or more deployment control elements where each deployment control elements carries an activation fluid that can degrade the deployment control elements as well as activating shape-memory polymers. In use, once the downhole assemblies are placed at the desired location, the deployment control elements can be degraded by the activation fluid, thus releasing the activation fluid. The released activation fluid in turn can activate a shape-memory article in the assemblies, causing the shape-memory article to expand and conform to a surface of a wellbore or a surface of a pipe.

The assemblies and methods described herein allow for a shape-memory article to activate on its own without the need for additional pumping operations or downhole heating equipment. Achieving this can save the end user time and simplify the installation operations. The assemblies and methods also have significant environmental benefits since direct handling of volatile activation fluid is avoided.

Figure 1:
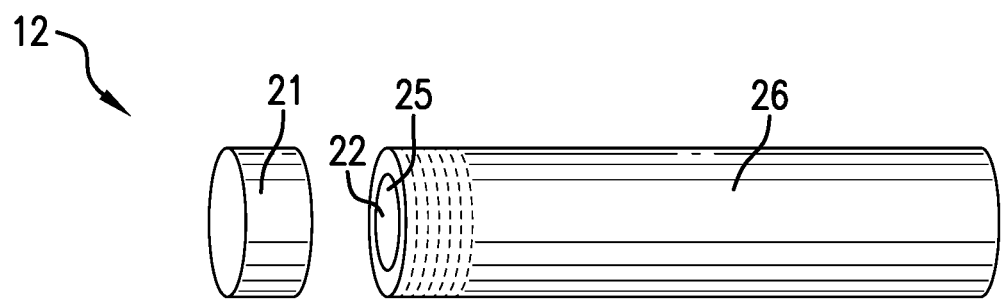
FIG. 1 illustrates a deployment control element according to an embodiment of the disclosure.

FIG. 1 illustrates a deployment control element (12) having a body (26) and a seal element (21) that forms an enclosure (25) together with the body (26). The deployment control element (12) further comprises an activation fluid (22) disposed in the enclosure (25). The seal element (12) can be a cap that can be screwed on the body (26) of the deployment control element (12).

The body, the seal element, or both can comprise a degradable material. The degradable material can gradually degrade in the presence of the activation fluid, and can include a metallic material or a polymer material. In an embodiment, the degradable material has a degradation rate of about 1 to about 450 mg/cm$^2$/hour, specifically about 10 to about 300 mg/cm$^2$/hour in the presence of the activation fluid at 200° F. (93° C.).

The metallic material can comprise a matrix material which includes at least one of Zn, Mg, Al, Mn, or an alloy thereof. In an aspect, the matrix material comprises an magnesium alloy. Magnesium alloys suitable for use include alloys of magnesium with aluminum (Al), cadmium (Cd), calcium (Ca), cobalt (Co), copper (Cu), iron (Fe), manganese (Mn), nickel (Ni), silicon (Si), silver (Ag), strontium (Sr), thorium (Th), tungsten (W), zinc (Zn), zirconium (Zr), or a combination comprising at least one of these elements. Particularly useful alloys include magnesium alloy particles including those prepared from magnesium alloyed with Ni, W, Co, Cu, Fe, or other metals. Alloying or trace elements can be included in varying amounts to adjust the corrosion rate of the magnesium. For example, four of these elements (cadmium, calcium, silver, and zinc) have to mild-to-moderate accelerating effects on corrosion rates, whereas four others (copper, cobalt, iron, and nickel) have a still greater effect on corrosion. Exemplary commercial magnesium alloys which include different combinations of the above alloying elements to achieve different degrees of corrosion resistance include but are not limited to, for example, those alloyed with aluminum, strontium, and manganese such as AJ62, AJ50x, AJ51x, and AJ52x alloys, and those alloyed with aluminum, zinc, and manganese such as AZ91A-E alloys.

The metallic material can further comprise a degradation reinforcement material comprising at least one of a metal; an oxide of the metal; a nitride of the metal; or a cermet of the metal; wherein the metal is at least one of Ni, W, Mo, Cu, Fe, Cr, or Co. The amount of the degradation reinforcement material can be about 0.01 wt % to about 50 wt %, about 0.1 to about 50 wt %, about 0.5 to about 40 wt %, about 1 to about 20 wt %, or about or about 1 wt % to about 10 wt %, based on the total weight of the degradable material.

The degradation reinforcement material, which has a lower reactivity relative to the matrix material, can act as a cathode, whereas the matrix material, which is more reactive than the degradation reinforcement material, are anodic relative to the degradation reinforcement material. A galvanic discharge cycle (e.g., corrosion) occurs between the relatively anodic and relatively cathodic materials in the presence of an electrolyte. By adjusting the compositions of the matrix material and the degradation reinforcement material as well as the amounts thereof, the degradation rate of the degradation material can be adjusted.

The degradable material can also comprise degradable polymers and their composites including poly(lactic acid) (PLA), poly(glycolic acid) (PGA), polycaprolactone (PCL), polylactide-co-glycolide, polyurethane such as polyurethane having ester or ether linkages, polyvinyl acetate, polyesters. The degradable material can include more than one degradable polymer.

In the deployment control element (12), an activation fluid (25) is disposed in the enclosure (22). The activation fluid can contain an activator, which is a material that is effective to reduce the glass transition temperature and/or rigidity of shape-memory polymers. Examples of the activator can include dimethyl sulfoxide, ketones, alcohols, phenols, ethers, esters, or acids. More than one activator can be used. As used herein, an alcohol refers to an organic compound having one or more hydroxyl groups attached to a saturated carbon atom. Examples of the alcohols include methanol, ethanol, isopropyl alcohol, n-butanol, 2-butanol, isobutanol, tert-butanol, n-pentanol, isopentanol. 2-pentanol, hexanol, octanol, isooctanol, cyclohexanol, 2-methyl-1-butanol, 2-methyl-1-pentanol, 3-methyl-2-butanol, 2-ethylhexanol, or glycols. The alcohol can be substituted and include ethoxylated alcohols, propoxylated alcohols, ethoxylated or propoxylated alcohols, or 2-butoxyethanol. The ethoxylated and/or propoxylated alcohols can have a structure represented by the Formula R—$(OCH_2CH_2)_m$ $(OCH_2CH_2)_n$—OH, wherein R is a $C_{1-7}$ alkyl, $C_{1-5}$ alkyl, $C_{1-3}$ alkyl, or ethyl, m is 0 to 8, and n is 0 to 8, provided that the sum of m and n is at least 1.

Examples of glycols include ethylene glycol, propylene glycol, 1,3-propanediol, 1,4-butanediol, 1,2,4-butanetriol, glycerin, erythritol, ethoxylated glycols, propoxylated glycols, ethoxylated or propoxylated glycols, diethylene glycol, or butoxy tri-glycol. Phenols can be substituted and include ethoxylated phenols, propoxylated phenols, or ethoxylated or propoxylated phenols.

Examples of esters include n-butyl acetate, n-butyl propionate, n-propyl propionate, n-pentyl propionate, or ethylene glycol monoethyl ether acetate. Exemplary ethers include ethylene glycol monobutyl ether (EGMBE). Specific ketones include acetone and acetylacetone. Examples of acids include adipate or maleate. The activator can be present in an amount of about 0.1% to about 15% based on a total volume of the activation fluid.

Preferably the activation fluid further comprises a degradation agent that degrades the seal element and/or the body of the deployment control element. The degradation agent can include at least one of potassium chloride, sodium chloride, sodium bromide, magnesium chloride, an acid, calcium chloride, calcium bromide, zinc bromide, ammonium chloride, cesium formate, or sodium formate. The activation fluid can include 0.1 to 8.0 wt % or about 7.5 to about 15 wt % of the degradation agent. Preferably the activation fluid comprises water with the degradation agent dissolved therein.

The degradation agent and the degradable material can be selected such that the deployment control element maintains its physical integrity before it is placed in the target location. Depending on the time needed for downhole operations, the degradable material can be degraded in about 4 hour, about 8 hours, about 24 hours, about 48 hours, up to one week, or up to two weeks after exposed to the activation fluid.

The deployment control element can be installed in various downhole assemblies. The downhole assemblies include a shape-memory article comprising a shape-memory polymer; and a deployment control element as described herein adjacent the shape-memory article. The downhole assemblies can also include a support structure, and the shape-memory article can be disposed at the support structure. The support structure is not particularly limited and can be a tubular member having a fluid conduit defined therein, for example, a pipe (e.g. perforated base pipe), tubing, or string. As used herein, "disposed at" means that the shape-memory article can surround the support structure, partially surround the support structure, or couple to the support structure without surrounding or partially surrounding the support structure. For example, the shape-memory article can be coupled to the end of the support structure. In an embodiment, the support structure is a tubular member having a portion that is perforated or slotted, and the shape-memory article is disposed at or at least partially surrounds the perforated or slotted portion of the tubular member. The size and shape of the openings are not limited and can be selected to provide a substantial area for flow of fluids and to maintain the structural integrity of the support structure.

The deployment control element can be disposed in the fluid conduit of the support structure. More than one deployment elements can be used.

Figure 2:
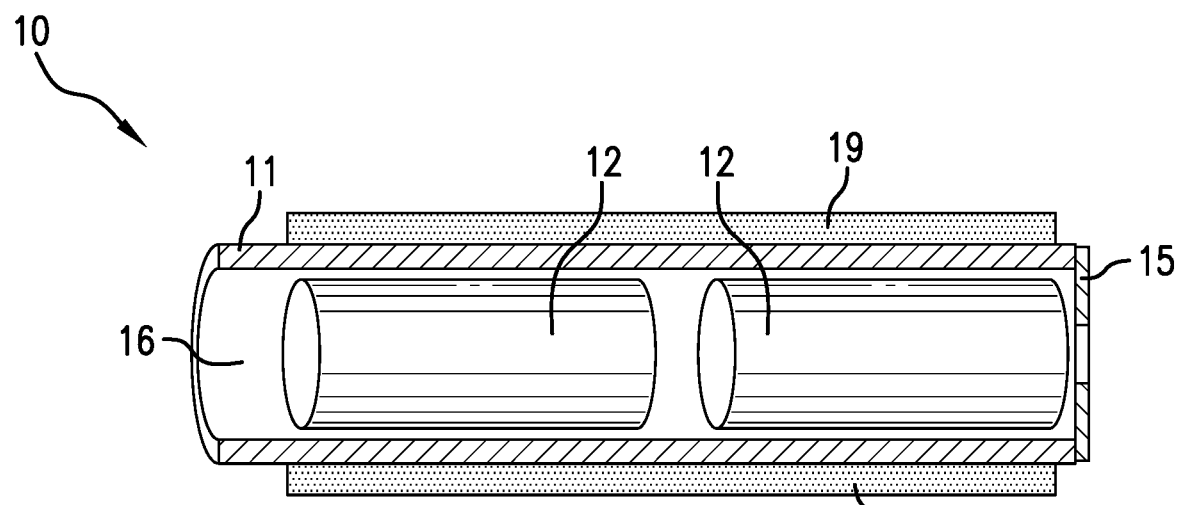
FIG. 2 illustrates a cross-sectional view of a downhole assembly comprising a deployment control element disposed in a fluid channel of a support structure.
Figure 3:
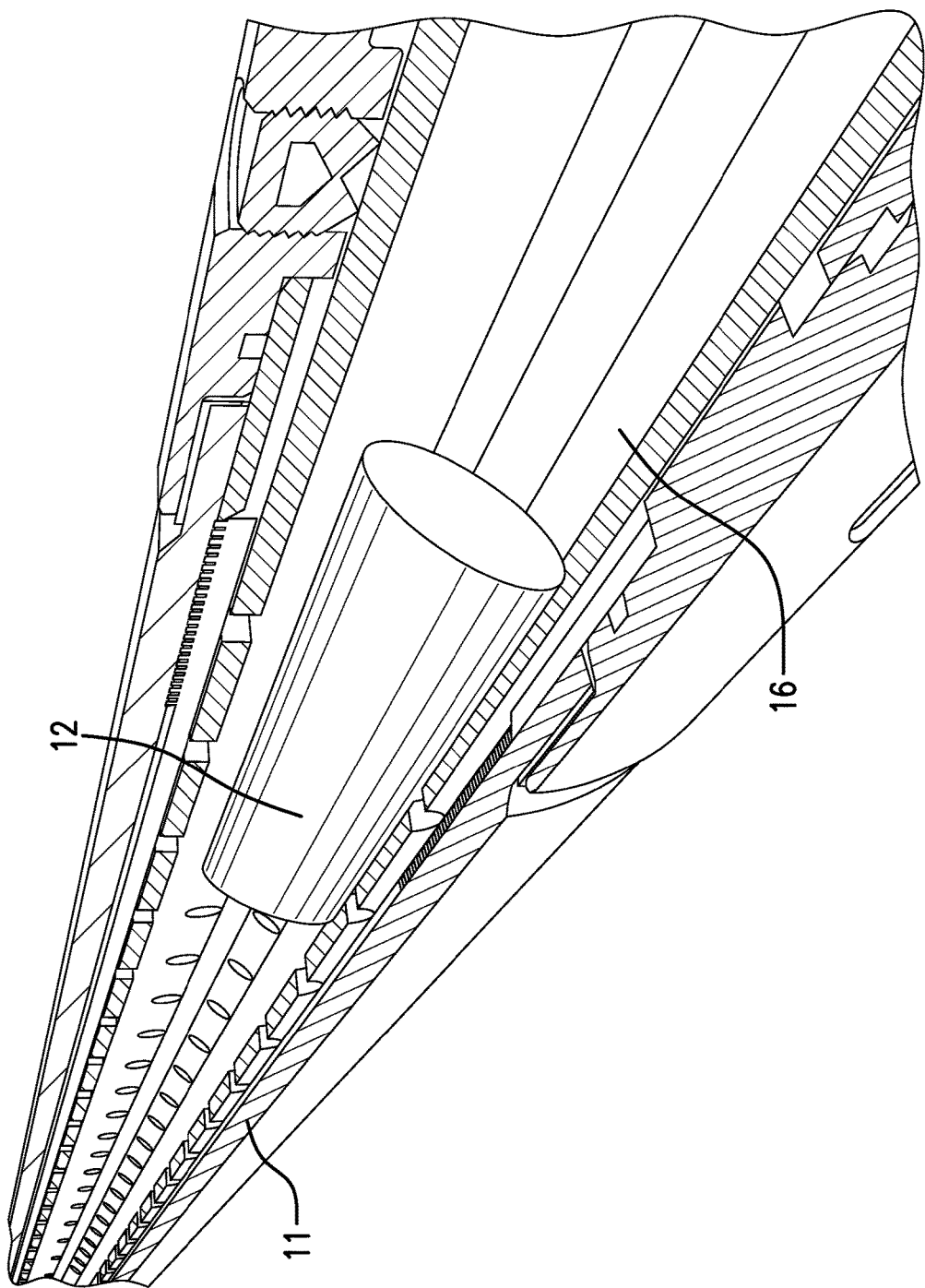
FIG. 3 is a partial cut-away view of a downhole assembly comprising a deployment control element disposed in a fluid channel of a support structure.

Referring to FIGS. 2 and 3, a downhole assembly (10) comprises a support structure (11), and a shape-memory article (19) disposed at the support structure (11). The support structure (11) can include a tubular member having a fluid conduit (16) defined therein. The deployment control element (12) can be disposed in the fluid conduit (16). The downhole assembly (10) can also include a stop member (15) mounted on the support structure. The stop member (15) can maintain the deployment control element (12) at the target location when the tubular member (11) is positioned vertically.

Figure 4:
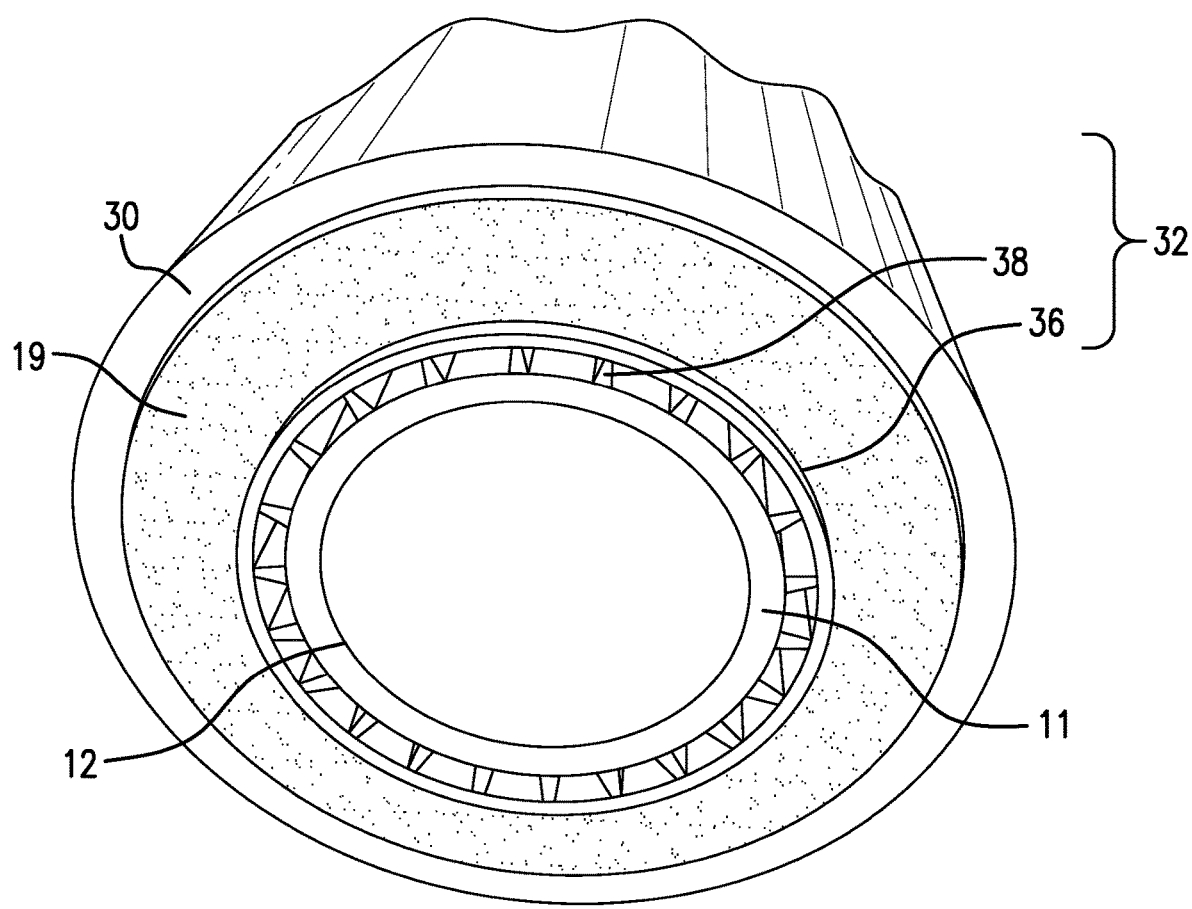
FIG. 4 illustrates a cross-sectional view of a downhole assembly disposed in a pipe.

As shown in FIG. 4, the downhole assembly can further include a screen (32) between the support structure (11) and the shape-memory article (19). A screen refers to a medium in which solids can be filtered from a fluid. The screen can be a wire wrapped screen, a slotted liner, a mesh form, or other screens known in the art. The screen (32) shown in FIG. 4 is a wire wrapped screen, and includes a plurality of spaced ribs or rib wires (38), around which a wire (36) is wrapped in spaced coils. The wrapping wire (36) can be welded to the rib wires (38) if needed.

The support structure (11) can be a tubular member having a perforated portion having a plurality of openings on a tubular wall. The wire wrapped screen (32) can surround the perforated portion of the support structure (11). In the downhole assembly of FIG. 4, the shape-memory article (19) is disposed on the wire based screen.

The shape-memory article can comprise a shape-memory polymer such as polyurethanes, epoxies, acrylates, nylon, polypropylene, polyesters, polytetrafluoroethylene, polyether ether ketone, polyamides, polyureas, polyvinyl alcohols, vinyl alcohol-vinyl ester copolymers, phenolic polymers, polybenzimidazoles, polystyrenes, a crosslinked polymer such as a crosslinked polytetrafluoroethylene, polyethylene oxide/acrylic acid/methacrylic acid copolymer crosslinked with N,N'-methylene-bis-acrylamide, polyethylene oxide/methacrylic acid/N-vinyl-2-pyrrolidone copolymer crosslinked with ethylene glycol dimethacrylate, polyethylene oxide/poly(methyl methacrylate)/N-vinyl-2-pyrrolidone copolymer crosslinked with ethylene glycol dimethacrylate, a cross-linked product of a polyphenylene sulfide and a polyphenylsulfone, a crosslinked polyphenylene sulfide, a crosslinked polyaryletherketone, a crosslinked polyetherether ketone, a crosslinked polyethersulfone (PESU), a crosslinked polyphenylenesulfone (PPSU), or a crosslinked polyphenylenesulfone urea. The shape-memory article can comprise more than one shape-memory polymer. Shape-memory polymers that may be used are not limited to the examples described herein, as other materials may be selected based on considerations such as downhole temperature, types of substances encountered downhole, and activation materials, etc. The shape-memory article can be a foam. For filtering such as sand control applications, the shape-memory article can be an open cell foam or a foam having both open and closed cells. Bulk shape-memory polymer can also be used.

In an aspect, the shape-memory article is a polyurethane foam. The polyurethane foam can be extremely tough and strong and is capable of being compressed and returned to its original non-compressed shape. The polyurethane foam material can be made from one or more polyol components, such as, but not limited to, a polyether, polyester or polycarbonate-based di- or multifunctional hydroxyl-ended prepolymer or polyol, and at least one isocyanate component, including, for example, a modified isocyanate (MI) or a modified diphenylmethane diisocyanate (MDI) based monomeric diisocyanate or polyisocyanate, as well as other additives such as blowing agents, molecular cross linkers, chain extenders, surfactants, colorants and catalysts.

To avoid premature expansion during run-in, the shape-memory polymers can have a glass transition temperature that is about 20° C. or about 30° C. higher than the actual downhole deployment/application temperature.

Before deployment, the shape-memory article is in a compacted shape. Compacted shape-memory article can be made by compressing or stretching the polymers with a mechanical force at a temperature greater than the glass transition temperature of the polymer. While still in the compacted state, the material is cooled down to a temperature below its glass transition temperature. The shape-memory polymers remain in the compacted shape induced on it after manufacture at surface temperature or at wellbore temperature during run-in.

The downhole assemblies described herein can be installed by introducing the downhole assemblies into a wellbore or a pipe. The seal element, the body, or both of the deployment element is then degraded by the activation fluid, thus releasing the activation fluid from the deployment control element. The released activation fluid can contact the shape-memory polymer and cause the shape-memory article to expand in the radial direction and conform to the wall of a wellbore or a pipe to provide an expanded shape-memory article.

When the shape-memory polymer is a polymer foam, as a result of the shape-memory polymer being expanded to its set position, the open cell porous shape-memory foam can prevent production of undesirable solids and allow only desired hydrocarbon fluids to flow through the shape-memory foam. The foam cell pore size, size distribution and cell openness may be adjusted by formulating different components and by controlling processing conditions in such a way that only desired hydrocarbon fluids are allowed to flow through and undesirable solids (sands, formation fines/particles, etc.) in the wellbore are prevented from being produced.

The downhole assembly can also be used in a remedial operation, such as a through tubing remedial sand control operation. When a previously installed downhole screen is damaged, and/or when sand control becomes an issue due to various reasons, a downhole assembly as described herein can be introduced into a pipe (30) as shown in FIG. 4 to filter off undesired material including sand that has entered the pipe to increase sand free production.

Set forth below are some embodiments of the foregoing disclosure:

Aspect 1. A downhole assembly comprising: a shape-memory article; and a deployment control element adjacent the shape-memory article, the deployment control element comprising a body and a seal element that forms an enclosure together with the body, the deployment control element further comprising an activation fluid disposed in the enclosure, wherein the body, the seal element, or both of the deployment control element is degradable in the presence of the activation fluid.

Aspect 2. The downhole assembly as in any prior Aspect, further comprising a support structure, and the shape-memory article is disposed at the support structure.

Aspect 3. The downhole assembly of Aspect 2, wherein the support structure is a tubular member having a fluid conduit defined therein.

Aspect 4. The downhole assembly of Aspect 3, wherein the deployment control element is disposed in the fluid conduit of the tubular member.

Aspect 5. The downhole assembly of Aspect 3, comprising more than one deployment control elements, and each deployment control elements is independently disposed in the fluid conduit of the tubular member.

Aspect 6. The downhole assembly as in any prior Aspect, further comprising a screen disposed of the support structure.

Aspect 7. The downhole assembly as in any prior Aspect, wherein the activation fluid comprises an activator, and the activator comprises at least one of dimethyl sulfoxide, a ketone, an alcohol, a phenol, an ether, an ester, or an acid.

Aspect 8. The downhole assembly as in any prior Aspect, wherein the activation fluid further comprises a degradation agent that degrades the body, the seal element, or both of the deployment control element.

Aspect 9. The downhole assembly of Aspect 8, wherein the degradation agent comprises at least one of potassium chloride, sodium chloride, sodium bromide, magnesium chloride, an acid, calcium chloride, calcium bromide, zinc bromide, ammonium chloride, cesium formate, or sodium formate.

Aspect 10. The downhole assembly as in any prior Aspect, wherein the body, the seal element, or both of the deployment control element has a degradation rate of about 1 to about 450 mg/cm$^2$/hour in the presence of the activation fluid at 200° F.

Aspect 11. The downhole assembly as in any prior Aspect, wherein the body, the seal element, or both of the deployment control element comprises a degradable material, and the degradable material is a metallic material or a polymeric material.

Aspect 12. The downhole assembly of Aspect 11, wherein the degradable material is a metallic material comprising at least one of Zn, Mg, Al, Mn, or an alloy thereof.

Aspect 13. The downhole assembly of Aspect 12, wherein the degradable material further comprises a degradation reinforcement material comprising at least one of a metal; an oxide of the metal; a nitride of the metal; or a cermet of the metal; wherein the metal is at least one of Ni, W, Mo, Cu, Fe, Cr, or Co.

Aspect 14. A method comprising: introducing into a wellbore or a pipe a downhole assembly comprising a shape-memory article in a compacted shape, and a deployment control element adjacent the shape-memory article, the deployment control element comprising a body and a seal element that forms an enclosure together with the body, the deployment control element further comprising an activation fluid disposed in the enclosure, wherein the body, the seal element, or both is degradable in the presence of the activation fluid; degrading the body, the seal member, or both of the deployment control element with the activation fluid; releasing the activation fluid from the deployment control element; and contacting the shape-memory article in the compacted shape with the released activation fluid to cause the shape-memory article to expand, and conform to a surface of the wellbore or the pipe.

Aspect 15. The method as in any prior Aspect, wherein the downhole assembly is introduced into the pipe, and the method further comprises flowing a fluid through the shape-memory article and filtering undesirable material from a fluid entered the pipe.

Aspect 16. The method as in any prior Aspect, wherein the downhole assembly further comprises a support structure including a tubular member having a fluid conduit defined therein, and the shape-memory article is disposed on an outer surface of the tubular member and at least partially surrounds the tubular member.

Aspect 17. The method of Aspect 16, wherein the deployment control element is disposed in the fluid conduit of the tubular member.

Aspect 18. The method as in any prior Aspect, wherein the activation fluid comprises an activator, and the activator comprises at least one dimethyl sulfoxide, a ketone, an alcohol, a phenol, an ether, an ester, or an acid.

Aspect 19. The method of as in any prior Aspect, wherein the activation fluid further comprises a degradation agent that degrades the body, the seal element, or both of the deployment control element.

Aspect 20. The method of Aspect 19, wherein the degradation agent comprises at least one of potassium chloride, sodium chloride, sodium bromide, magnesium chloride, an acid, calcium chloride, calcium bromide, zinc bromide, ammonium chloride, cesium formate, or sodium formate.

The use of the terms "a" and "an" and "the" and similar referents in the context of describing the invention (especially in the context of the following claims) are to be construed to cover both the singular and the plural, unless otherwise indicated herein or clearly contradicted by context. The terms "about", "substantially" and "generally" are intended to include the degree of error associated with measurement of the particular quantity based upon the equipment available at the time of filing the application. For example, "about" and/or "substantially" and/or "generally" can include a range of +8% or 5%, or 2% of a given value.

Unless defined otherwise, technical and scientific terms used herein have the same meaning as is commonly understood by one of skill in the art to which this invention belongs.

All references cited herein are incorporated by reference in their entirety. While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A downhole assembly comprising:
   a shape-memory article; and
   a deployment control element adjacent the shape-memory article, the deployment control element comprising a body and a seal element that forms an enclosure together with the body, the deployment control element further comprising an activation fluid disposed in the enclosure, the activation fluid comprising an activator, and the activator comprising at least one of dimethyl sulfoxide, a ketone, an alcohol, a phenol, an ether, an ester, or an acid, wherein the body, the seal element, or both of the deployment control element is degradable in the presence of the activation fluid.

2. The downhole assembly of claim 1, further comprising a support structure, and the shape-memory article is disposed at the support structure.

3. The downhole assembly of claim 2, wherein the support structure is a tubular member having a fluid conduit defined therein.

4. The downhole assembly of claim 3, wherein the deployment control element is disposed in the fluid conduit of the tubular member.

5. The downhole assembly of claim 3, comprising more than one deployment control elements, and each deployment control elements is independently disposed in the fluid conduit of the tubular member.

6. The downhole assembly of claim 1, further comprising a screen disposed of the support structure.

7. The downhole assembly of claim 1, wherein the activation fluid further comprises a degradation agent that degrades the body, the seal element, or both of the deployment control element.

8. The downhole assembly of claim 7, wherein the degradation agent comprises at least one of potassium chloride, sodium chloride, sodium bromide, magnesium chloride, an acid, calcium chloride, calcium bromide, zinc bromide, ammonium chloride, cesium formate, or sodium formate.

9. The downhole assembly of claim 1, wherein the body, the seal element, or both of the deployment control element comprises a degradable material, and the degradable material is a metallic material or a polymeric material.

10. A downhole assembly comprising:
a shape-memory article, and
a deployment control element adjacent the shape-memory article, the deployment control element comprising a body and a seal element that forms an enclosure together with the body, the deployment control element further comprising an activation fluid disposed in the enclosure, wherein the body, the seal element, or both of the deployment control element is degradable in the presence of the activation fluid, wherein the body, the seal element, or both of the deployment control element has a degradation rate of about 1 to about 450 mg/cm$^2$/hour in the presence of the activation fluid at 200° F.

11. A downhole assembly comprising:
a shape memory article; and
a deployment control element adjacent the shape-memory article, the deployment control element comprising a body and a seal element that forms an enclosure together with the body, the deployment control element further comprising an activation fluid disposed in the enclosure, wherein the body, the seal element, or both of the deployment control element is degradable in the presence of the activation fluid, wherein the degradable material is a metallic material comprising at least one of Zn, Mg, Al, Mn, or an alloy thereof wherein the degradable material further comprises a degradation reinforcement material comprising at least one of a metal; an oxide of the metal; a nitride of the metal; or a cermet of the metal; wherein the metal is at least one of Ni, W, Mo, Cu, Fe, Cr, or Co.

12. A method comprising:
introducing into a wellbore or a pipe a downhole assembly comprising
a shape-memory article in a compacted shape, and
a deployment control element adjacent the shape-memory article, the deployment control element comprising a body and a seal element that forms an enclosure together with the body, the deployment control element further comprising an activation fluid disposed in the enclosure wherein the activation fluid comprises an activator, and the activator comprises at least one dimethyl sulfoxide, a ketone, an alcohol, a phenol, an ether, an ester, or an acid, wherein the body, the seal element, or both is degradable in the presence of the activation fluid;
degrading the body, the seal member, or both of the deployment control element with the activation fluid;
releasing the activation fluid from the deployment control element; and
contacting the shape-memory article in the compacted shape with the released activation fluid to cause the shape-memory article to expand, and conform to a surface of the wellbore or the pipe.

13. The method of claim 12, wherein the downhole assembly is introduced into the pipe, and the method further comprises flowing a fluid through the shape-memory article and filtering undesirable material from a fluid entered the pipe.

14. The method of claim 12, wherein the downhole assembly further comprises a support structure including a tubular member having a fluid conduit defined therein, and the shape-memory article is disposed on an outer surface of the tubular member and at least partially surrounds the tubular member.

15. The method of claim 14, wherein the deployment control element is disposed in the fluid conduit of the tubular member.

16. The method of claim 14, wherein the activation fluid further comprises a degradation agent that degrades the body, the seal element, or both of the deployment control element.

17. The method claim 16, wherein the degradation agent comprises at least one of potassium chloride, sodium chloride, sodium bromide, magnesium chloride, an acid, calcium chloride, calcium bromide, zinc bromide, ammonium chloride, cesium formate, or sodium formate.

* * * * *